(12) United States Patent
Honda

(10) Patent No.: US 6,963,525 B2
(45) Date of Patent: Nov. 8, 2005

(54) OPTICAL DISC RECORDING METHOD, OPTICAL DISC RECORDING DEVICE, AND OPTICAL DISC

(75) Inventor: Kazuhiko Honda, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 294 days.

(21) Appl. No.: 09/863,479

(22) Filed: May 23, 2001

(65) Prior Publication Data

US 2002/0003760 A1 Jan. 10, 2002

(30) Foreign Application Priority Data

May 23, 2000 (JP) .................................... P.2000-151248

(51) Int. Cl.⁷ ............................................... G11B 5/09
(52) U.S. Cl. .................................................. 369/47.53
(58) Field of Search .......................... 369/47.53, 47.25, 369/47.27, 47.5, 53.26, 53.31, 53.35, 53.36, 53.37, 116, 275.3

(56) References Cited

U.S. PATENT DOCUMENTS

| | | | | |
|---|---|---|---|---|
| 5,513,166 A | * | 4/1996 | Tokumitsu et al. | 369/53.36 |
| 5,537,381 A | * | 7/1996 | Fuji | 369/47.51 |
| 5,737,289 A | * | 4/1998 | Udagawa | 369/47.5 |
| 6,052,347 A | * | 4/2000 | Miyata | 369/47.53 |
| 6,061,316 A | * | 5/2000 | Nakamura et al. | 369/47.53 |
| 6,215,758 B1 | * | 4/2001 | Horimai et al. | 369/275.3 |
| 6,356,515 B1 | * | 3/2002 | Kumita et al. | 369/116 |
| 6,438,078 B2 | * | 8/2002 | Yamazaki et al. | 369/47.25 |
| 6,526,012 B1 | * | 2/2003 | Narumi et al. | 369/47.53 |
| 6,526,014 B2 | * | 2/2003 | Masaki et al. | 369/47.53 |

FOREIGN PATENT DOCUMENTS

EP 0 642 122 A1 9/1994

* cited by examiner

*Primary Examiner*—Thang V. Tran
(74) *Attorney, Agent, or Firm*—Pillsbury Winthrop Shaw Pittman LLP

(57) ABSTRACT

Prior to an actual record on an optical disc (10), in an outer peripheral test area (22a) which is on the outer peripheral side with respect to a program area (18) of the optical disc (10), a test record is repeatedly performed a plurality of times while the velocity is controlled to a predetermined linear velocity and the recording power is sequentially changed. An appropriate recording power value at the linear velocity is obtained on the basis of reproduced signals of the plural test records in the outer peripheral test area. In an actual record on the optical disc (10), the record is performed while the recording power is controlled to the appropriate value in accordance with the linear velocity, on the basis of the obtained recording power value.

58 Claims, 6 Drawing Sheets

OPTICAL DISC RECORDING METHOD, OPTICAL DISC RECORDING DEVICE, AND OPTICAL DISC

BACKGROUND OF THE INVENTION

1. Field of the Invention

The present invention relates to a method and apparatus for performing a record on a recordable optical disc such as a CD-R (CD-Recordable), CD-RW (CD-ReWritable), etc., and also relates to an optical disc. More particularly, the present invention relates to an optical disc recording method, an optical disc recording apparatus, and an optical disc, in which an appropriate recording power of a light beam can be accurately obtained by a test record so as to perform an actual record with high quality.

The present application is based on Japanese Patent Application No. 2000-151248, which is incorporated herein by reference.

2. Description of the Related Art

As a method of performing a record on a constant linear velocity (CLV) recordable optical disc such as a CD-R or CD-RW, used is a high-speed recording system in which a record is performed at a linear velocity higher than a standard linear velocity (single speed, i.e., 1× speed).

In a constant linear velocity control record, the spindle rotation number is higher as the record is performed on a more inner peripheral side of an optical disc. In the case of 16× speed, for example, the spindle rotation number is 8,000 or more rpm. Therefore, the degree of self-excited vibration of a drive is large (particularly, in the case of an eccentric disc). When a record operation is to be performed on an optical disc, an OPC (Optimum Power Control: adjustment to the optimum recording power of a recording beam) is previously performed by a test record. Typically, a test record is performed in a PCA (Power Calibration Area) which is in the innermost peripheral portion of a disc. In the case of a high-speed record, therefore, the spindle rotation number in a test record is so high that the test record is made unstable by self-excited vibration of the drive and the OpC cannot be accurately performed. As a result, an actual record of high quality cannot be performed.

In the case of a high-speed record, in an actual record, the spindle rotation number is higher as the record is performed on a more inner peripheral portion of a disc, and hence pits are caused to be unstably formed, by self-excited vibration. When so-called on-the-fly writing in which writing is conducted directly from a CD-ROM drive to a CD-R (RW) drive without once forming an image file in a hard disc drive is to be performed at a high speed, a recording method may be employed in which a record is performed while the CD-ROM drive conducts a high-speed reproduction at a constant revolution number (CAV), and the CD-R (RW) drive conducts a high-speed record at a constant linear velocity. In this method, the linear velocity of the CD-ROM drive which is conducting CAV reproduction is about 16× speed in the inner peripheral side even when the linear velocity is about 32× speed in the outer peripheral side. In an operation of reproducing a peripheral side, therefore, the data transfer cannot overtake the writing operation and so-called buffer under-run occurs, thereby causing the writing operation to fail.

As a method of solving the problems in an actual record, a method has been proposed in which, as shown in FIG. 2, a record on a CD-R (RW) is performed by CAV in the inner peripheral side, and by CLV in the outer peripheral side. Specifically, at the innermost peripheral position of a program area, a CAV record is started at a rotation number corresponding to, for example, 12× speed. When the linear velocity at this rotation number reaches, for example, 16× speed, a CLV record is thereafter performed at 16× speed. In this way, the CAV record and the CLV record are switched over, so that the maximum rotation number is suppressed to restrain self-excited vibration, and an on-the-fly writing error is prevented from occurring.

In the method in which a record is performed with switching over the CAV record and the CLV record, the liner velocity is changed during the CAV record, and hence the optimum recording power of a recording laser beam is sequentially changed. In order to comply with this, for example, an OPC which is to be performed in the test record prior to the actual record is performed for each of the initial value of the linear velocity (the minimum linear velocity) and the final value of the linear velocity (the maximum linear velocity) in the CAV record, and the optimum recording powers respectively for the two linear velocities are obtained. In a record according to the present invention, in an area where the CAV record is performed, a recording power of each position is obtained by, in accordance with the linear velocity at the position, interpolating optimum recording powers which have been obtained with respect to the initial value of the linear velocity and the final value of the linear velocity, and controlled to the interpolated value, and, in an the area where the CLV record is performed, the record is performed while maintaining the optimum recording power at the final value of the linear velocity in the CAV record. As described above, in the method in which a record is performed with switching over the CAV record and the CLV record, when an OPC is performed in the PCA area which is in the innermost peripheral portion of a disc, the OPC at the final value of the linear velocity must be performed at a high revolution number, so that the meaning of performing the CAV record in the inner peripheral side to suppress the maximum rotation number is lost.

SUMMARY OF THE INVENTION

The present invention has been conducted in view of the above-discussed problems. It is an object of the present invention to provide a method and apparatus for performing a record on an optical disc and an optical disc, in which an appropriate recording power of a light beam can be accurately obtained by a test record so as to perform an actual record with high quality.

To achieve the above object, according to a first aspect of the present invention, there is provided an optical disc recording method which comprises:

repeatedly performing a test record a plurality of times, prior to an actual record on an optical disc, in an outer peripheral test area of the optical disc which is on an outer peripheral side with respect to a program area of the optical disc, wherein the test record includes:

controlling a velocity to a predetermined linear velocity, and sequentially changing a recording power;

obtaining an appropriate recording power value at the linear velocity, on the basis of reproduced signals of the plural test records in the outer peripheral test area; and performing an actual record on the optical disc while controlling the recording power to the appropriate recording power value at the predetermined linear velocity, or to an appropriate recording power value which is obtained on the basis of the appropriate recording power value at another linear velocity.

According to the optical disc recording method of the present invention, since a test record is performed in an outer peripheral test area which is on an outer peripheral side with respect to a program area of an optical disc, the test record can be performed at a relatively low rotation number even when the linear velocity is high. Therefore, vibration of a driver can be restrained and the test record can be correctly performed, so that an appropriate recording power at the liner velocity can be accurately obtained. In an outer peripheral portion of a disc, a scratch or fingerprints are often formed as a result of handling by the user, and hence there arises a possibility that an error is caused in the measurement of the appropriate recording power by such a defect. In the recording method of the present invention, therefore, the test record in the outer peripheral test area is repeatedly performed a plurality of times, and an appropriate recording power value at the linear velocity is obtained on the basis of reproduced signals of the plural test records in the outer peripheral test area. As a result, the appropriate recording power in the outer peripheral test area can be measured more correctly.

In the recording method according to the present invention, on the basis of reproduced signals of the plural test records in the outer peripheral test area, a recording power value at which a predetermined parameter relating to a reproduced signal quality has an appropriate value may be obtained for each of the test records, and the appropriate recording power value at the predetermined linear velocity may be obtained on the basis of recording power values which are obtained respectively for the test records. In this case, for example, an outlier value(s) of the recording power values respectively obtained for the plural test records in the outer peripheral test area may be eliminated, an average value of remaining recording power values may be obtained, and the average value may be obtained as the appropriate recording power value at the predetermined linear velocity.

In a portion where a scratch or fingerprints are formed, the recording power value at which the predetermined parameter relating to the reproduced signal quality has an appropriate value is high. An outer peripheral side of a disc is influenced by surface runout by a larger degree than an inner peripheral side. When the angle formed by the disc surface and the light beam axis is deviated from a right angle by such surface runout, the recording power value at which the predetermined parameter relating to the reproduced signal quality has an appropriate value becomes high. In place of the average value, therefore, a minimum value of the recording power values respectively obtained for the plural test records in the outer peripheral test area may be obtained, and the minimum value may be obtained as the appropriate recording power value at the predetermined linear velocity.

When the plural test records in the outer peripheral test area are respectively performed in areas which are sequentially shifted in a circumferential direction of the optical disc, it is possible to prevent the same scratch or fingerprints from exerting influence in every measurement. For example, the outer peripheral test area may be set in a remaining area which is obtained by removing an area corresponding to a predetermined lead-out area from a portion which is on an outer peripheral side of an information area with starting from a maximum allowable outer peripheral position of the program area.

To achieve the above object, according to a second aspect of the present invention, there is provided an optical disc recording method in which an actual record is performed on an optical disc while, in an inner peripheral side of the optical disc with respect to an adequate radial position, a velocity is controlled by making a rotational velocity constant, and, in an outer peripheral side of the optical disc, the velocity is controlled by making a linear velocity constant at a final value of a linear velocity in the constant rotational velocity control. The optical disc recording method comprises:

performing a test record one time, prior to the actual record on the optical disc, in an inner peripheral test area of the optical disc which is on an inner peripheral side with respect to a program area of the optical disc, while controlling a velocity by making a linear velocity constant at an initial value of the linear velocity in the constant rotational velocity control record and sequentially changing a recording power;

repeatedly performing the test record a plurality of times, in an outer peripheral test area which is on an outer peripheral side with respect to the program area of the optical disc, while controlling the velocity by making a linear velocity constant at a final value of a linear velocity in the constant rotational velocity control record and sequentially changing a recording power;

on the basis of a reproduced signal of the one test record in the inner peripheral test area, obtaining a recording power value at which a predetermined parameter relating to a reproduced signal quality has an appropriate value, so that the obtained value is set as a recording power value at the initial value of the linear velocity in the constant rotational velocity control record;

on the basis of reproduced signals of the plural test records in the outer peripheral test area, obtaining a recording power value at which the parameter has an appropriate value for each of the test records, and obtaining an appropriate recording power value on the basis of recording power values which are obtained respectively for the test records, so that the obtained value is set as a recording power value at the final value of the linear velocity in the constant rotational velocity control record and in the constant linear velocity control record;

in the area where the constant rotational velocity control record is performed when an actual record is performed on the optical disc, in accordance with the linear velocity at each position, interpolating the value which has been set as the recording power value at the initial value of the linear velocity and the value which has been set as the recording power value at the final value of the linear velocity, and controlling the recording power value to the interpolated value; and in the area where the constant linear control record is performed when the actual record is performed on the optical disc, controlling the recording power value to the value which has been set as the recording power value in the constant linear velocity control record.

According to the recording method of the present invention, in an inner peripheral test area which is on an inner peripheral side with respect to the program area of the optical disc, a test record is performed while the velocity is controlled by making a linear velocity constant at the initial value of the linear velocity in the constant rotational velocity control record and a recording power is sequentially changed, and, in an outer peripheral test area which is on an outer peripheral side with respect to the program area of the optical disc, the test record is performed while the velocity is controlled by making a linear velocity constant at a final value of a linear velocity in the constant rotational velocity control record. Therefore, the test record at the final value of the linear velocity can be performed at a relatively low rotation number. Consequently, the test record at the final value of the linear velocity can be correctly performed, and an appropriate recording power at the final value of the liner velocity can be accurately obtained, so that an actual record can be performed at every radial position while the recording power is controlled to an appropriate one. In an outer peripheral portion of a disc, a scratch or fingerprints are often formed as a result of handling by the user, and hence there arises a possibility that an error is caused in the measurement of the appropriate recording power by such a defect. In the recording method according to the present invention, therefore, the test record in the outer peripheral test area is repeatedly performed a plurality of times, and an appropriate recording power value is obtained on the basis of recording power values which are obtained respectively for the test records, and the obtained value is set as a recording power value at the final value of the linear velocity in the constant rotational velocity control record, and in the constant linear velocity control record. As a result, the appropriate recording power in the outer peripheral test area can be measured more correctly.

In the recording method according to the present invention, for example, an outlier value(s) of the recording power values respectively obtained for the plural test records in the outer peripheral test area may be eliminated, an average value of remaining recording power values may be obtained, and the average value may be set as the recording power value at the final value of the linear velocity in the constant rotational velocity control record, and in the constant linear velocity control record. Alternatively, for example, a minimum value of the recording power values respectively obtained for the plural test records in the outer peripheral test area may be obtained, and the minimum value maybe set as the appropriate recording power value at the final value of the linear velocity in the constant rotational velocity control record, and in the constant linear velocity control record. When the plural test records in the outer peripheral test area are respectively performed in areas which are sequentially shifted in a circumferential direction of the optical disc, it is possible to prevent the same scratch or fingerprints from exerting influence in every measurement. For example, the outer peripheral test area may be set in a remaining area which is obtained by removing an area corresponding to a predetermined lead-out area from a portion which is on an outer peripheral side of an information area with starting from a maximum allowable outer peripheral position of the program area.

To achieve the above object, according to a third aspect of the present invention, there is provided an optical disc recording device in which an actual record is performed on an optical disc while, in an inner peripheral side of the optical disc with respect to an adequate radial position, a velocity is controlled by making a rotational velocity constant, and, in an outer peripheral side of the optical disc, the velocity is controlled by making a linear velocity constant at a final value of a linear velocity in the constant rotational velocity control. The optical disc recording device comprises:

a disc servo circuit which rotates the optical disc;

an optical pickup which irradiates the optical disc with a light beam to perform record and reproduction operations on the optical disc;

an optical power controlling section which controls a power of the light beam emitted from the optical pickup;

a signal quality detecting section which obtains a predetermined parameter relating to a reproduced signal quality on the basis of a reproduced signal detected by the optical pickup; and a system controlling section, wherein, in the system controlling section, prior to the actual record on the optical disc, in an inner peripheral test area which is on an inner peripheral side with respect to a program area of the optical disc, a test record is performed one time while a velocity is controlled by making a linear velocity constant at an initial value of the linear velocity in the constant rotational velocity control record and a recording power is sequentially changed, and, in an outer peripheral test area which is on an outer peripheral side with respect to the program area of the optical disc, the test record is repeatedly performed a plurality of times while the velocity is controlled by making a linear velocity constant at a final value of a linear velocity in the constant rotational velocity control record, on the basis of a reproduced signal of the one test record in the inner peripheral test area, a recording power value at which a predetermined parameter relating to a reproduced signal quality has an appropriate value is obtained, and the obtained value is set as a recording power value at the initial value of the linear velocity in the constant rotational velocity control record, on the basis of reproduced signals of the plural test records in the outer peripheral test area, a recording power value at which the parameter has an appropriate value is obtained for each of the test records, and an appropriate recording power value is obtained on The basis of recording power values which are obtained respectively for the test records, and the obtained value is set as a recording power value at the final value of the linear velocity in the constant rotational velocity control record, and in the constant linear velocity control record, and in an actual record on the optical disc, in the area where the constant rotational velocity control record is performed, the record is performed while, in accordance with the linear velocity at each position, interpolating the value which has been set as the recording power value at the initial value of the linear velocity, and the value which has been set as the recording power value at the final value of the linear velocity, and controlling the recording power value to the interpolated value, and, in the area where the constant linear control record is performed, the record is performed while controlling the recording power value to the value which has been set as the recording power value in the constant linear velocity control record.

In the recording device according to the present invention, for example, the system controlling section may eliminate an outlier value(s) of the recording power values respectively obtained for the plural test records in the outer peripheral test area, obtain an average value of remaining recording power values, and set the average value as the recording power value at the final value of the linear velocity in the constant rotational velocity control record, and in the constant linear velocity control record. Alternatively, for example, the system controlling section may obtain a minimum value of the recording power values respectively obtained for the plural test records in the outer peripheral test area, and set the minimum value as the recording power value at the final value of the linear velocity in the constant rotational velocity control record, and in the constant linear velocity control record. When the system controlling section respectively performs the plural test records in the outer peripheral test area in areas which are sequentially shifted in a circumferential direction of the optical disc, it is possible to prevent the same scratch or fingerprints from exerting influence in every measurement. For example, the system controlling section may set the outer peripheral test area in a remaining area which is obtained by removing an area corresponding to a predetermined lead-out area from a portion which is on an outer peripheral side of an information area with starting from a maximum allowable outer peripheral position of the program area.

To achieve the above object, according to a fourth aspect of the present invention, there is provided an optical disc which comprises:

an inner peripheral test area which is formed in a portion on an inner peripheral side of the optical disc with respect to a program area; and an outer peripheral test area which is wider than the inner peripheral test area, and is formed in a portion on an outer peripheral side of the optical disc with respect to the program area.

According to the optical disc as constructed above, one set of OPCs in which a test record is performed one time in the inner peripheral test area, and a plurality of times in the outer peripheral test area can be executed a required number of times.

BRIEF DESCRIPTION OF THE DRAWINGS

The above and other objects and advantages of the present invention will become more apparent by describing in detail preferred embodiments thereof with reference to the accompanying drawings, wherein.

DETAILED DESCRIPTION OF THE PREFERRED EMBODIMENTS

Figure 3:
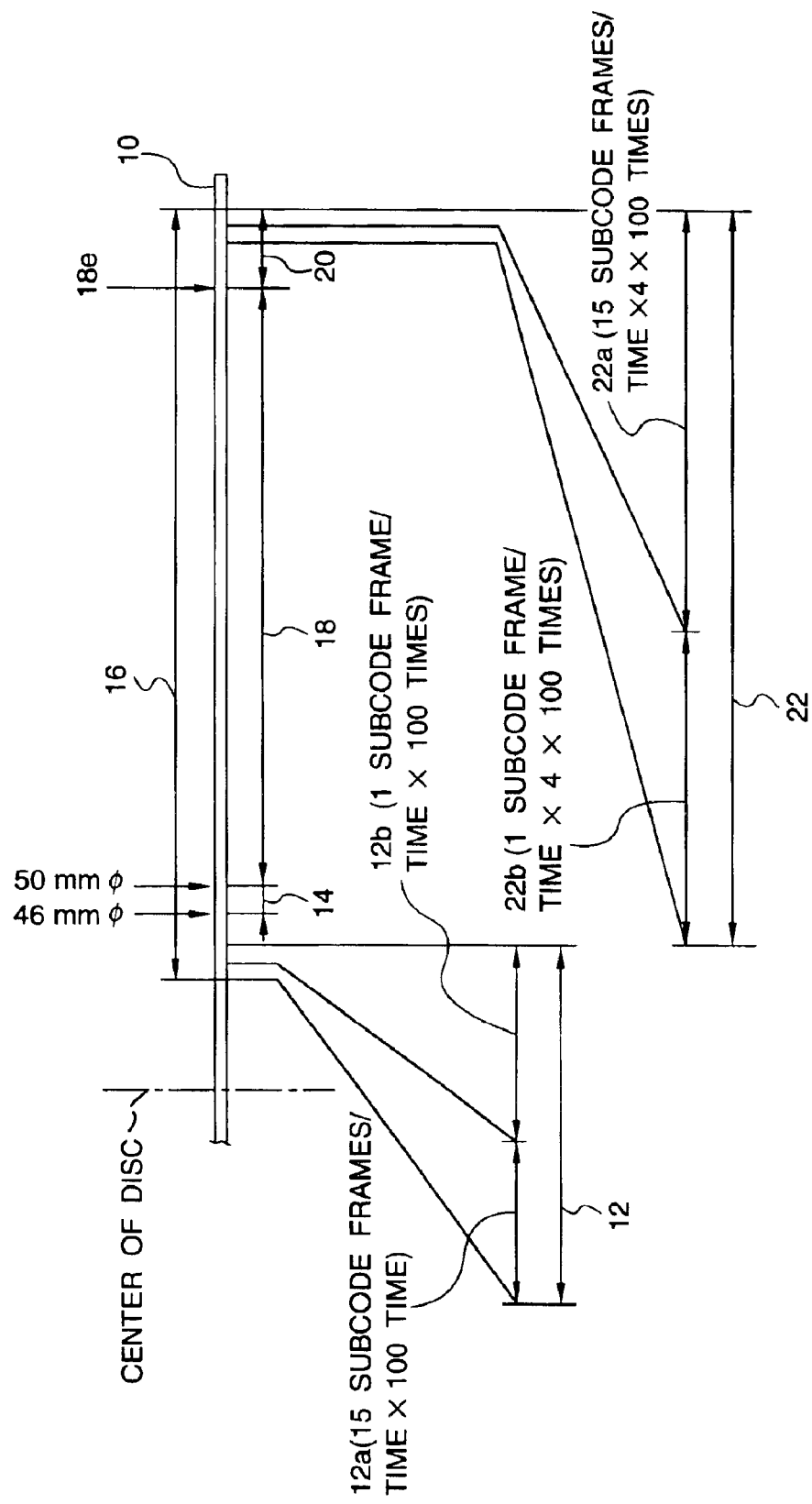
FIG. 3 is a section view taken in a radial direction of a constant-linear velocity recording type optical disc according to the present invention, and showing an example of area segmentation.

Hereinafter, embodiments of the present invention will be described. First, an example of area segmentation in a constant-linear velocity recording type optical disc of the present invention is shown in FIG. 3. In this example, a test area is set in an outer peripheral portion of an information area 16 of a disc according to the CD-R (RW) standard. A zone in a diameter range of 46 to 50 mm of the optical disc 10 is prepared as a lead-in area 14, and an inner peripheral PCA area 12 is prepared in a portion which is on a more inner peripheral side. The inner peripheral PCA area 12 is configured by a test area 12a and a count area 12b. In the test area 12a, a test record for an OPC is performed. For example, one test record is performed while the recording power is changed in 15 steps, and EFM signals for one subcode frame (not restricted to this) are recorded for each of the recording powers, so that EFM signals for 15 subcode frames are recorded in total. A capacity (for example, 1,500 subcode frames) which allows such a test record to be performed 100 times (for 100 OPCs because one test record is performed in one OPC) is assigned to the test area 12a. Each time when an OPC is performed, EFM signals for one subcode frame are recorded into the count area 12b. A capacity (for example, 100 subcode frames for 100 OPCs) for the same number of OPCs as that of the test area 12a is assigned to the count area 12b. When an OPC is to be performed, the end point of the range of the count area 12b where EFM signals have been recorded is previously detected, and the point in the test area 12a from which the present test record is to be started is determined.

A program area 18 is prepared on the outer peripheral side with respect to the lead-in area 14, and a remaining area 20 is prepared adjacent to the maximum allowable outer peripheral position 18e of the program area 18, and on the outer peripheral side thereof. Time information is recorded as ATIP information into wobbles of tracks (pregrooves) of the entire information area 16. As the ATIP information, with setting the starting position of the program area 18 as a reference point, on the outer peripheral side with respect to the starting position, values which are continuous (simply increased) are recorded to the end of the outer peripheral side of the information area 16, and, on the inner peripheral side, values which are continuous (simply decreased) are recorded to the end of the inner peripheral side of the information area 16. A lead-out area is formed immediately after the end (the position where the record is closed) of the program area 18. In the case where the program area 18 is formed (recorded) in the vicinity of the maximum allowable outer peripheral position 18e, the lead-out area is formed with entering the remaining area 20 which is outside the lead-out area. In the lead-out area, a capacity for 1.5 minutes must be ensured at the minimum. An area which is obtained by removing an area corresponding to the lead-out area from the remaining area 20 is used as an outer peripheral side PCA area 22. The outer peripheral PCA area 22 is ensured to be wider than the inner peripheral PCA area 12. In an existing CD-R (RW) disc also, there is the remaining area 20 for about 4 to 5 minutes, and hence a sufficiently wide area can be ensured as the outer peripheral side PCA area 22. In place of an existing CD-R (RW) disc, a dedicated optical disc in which the inner peripheral PCA area 12 and the outer peripheral side PCA area 22 are formed may be used.

The outer peripheral side PCA area 22 is configured by a test area 22a and a count area 22b. In the example of FIG. 3, the count area 22b is placed on the inner peripheral side, and the test area 22a is placed on the outer peripheral side. In contrast with this, the count area 22b may be placed on the outer peripheral side, and the test area 22a may be placed on the inner peripheral side. In the test area 22a, a test record for an OPC is performed. For example, one test record is performed while the recording power is changed in 15 steps, and EFM signals for one subcode frame are recorded for each of the recording powers, so that EFM signals for 15 subcode frames are recorded in total. A capacity which allows an OPC to be performed the same number of times as that of the test area 12a is assigned to the test area 22a. In the case where 100 OPCs are to be conducted and a test record is repeatedly performed four times in one OPC, a capacity (for example, 6,000 subcode frames) which allows the test record to be performed 400 times in total is assigned to the test area 22a. Each time when a test record is performed, EFM signals for one subcode frame are recorded into the count area 22b. A capacity (for example, 400 subcode frames for 100 OPCs and in the case where a test record is performed four times in one OPC) for the same number of OPCs as that of the test area 22a is assigned to the count area 22b. When an OPC is to be performed, the end point of the range of the count area 22b where EFM signals have been recorded is previously detected, and the point in the test area 22a from which the present test record is to be started is determined.

Figure 4:
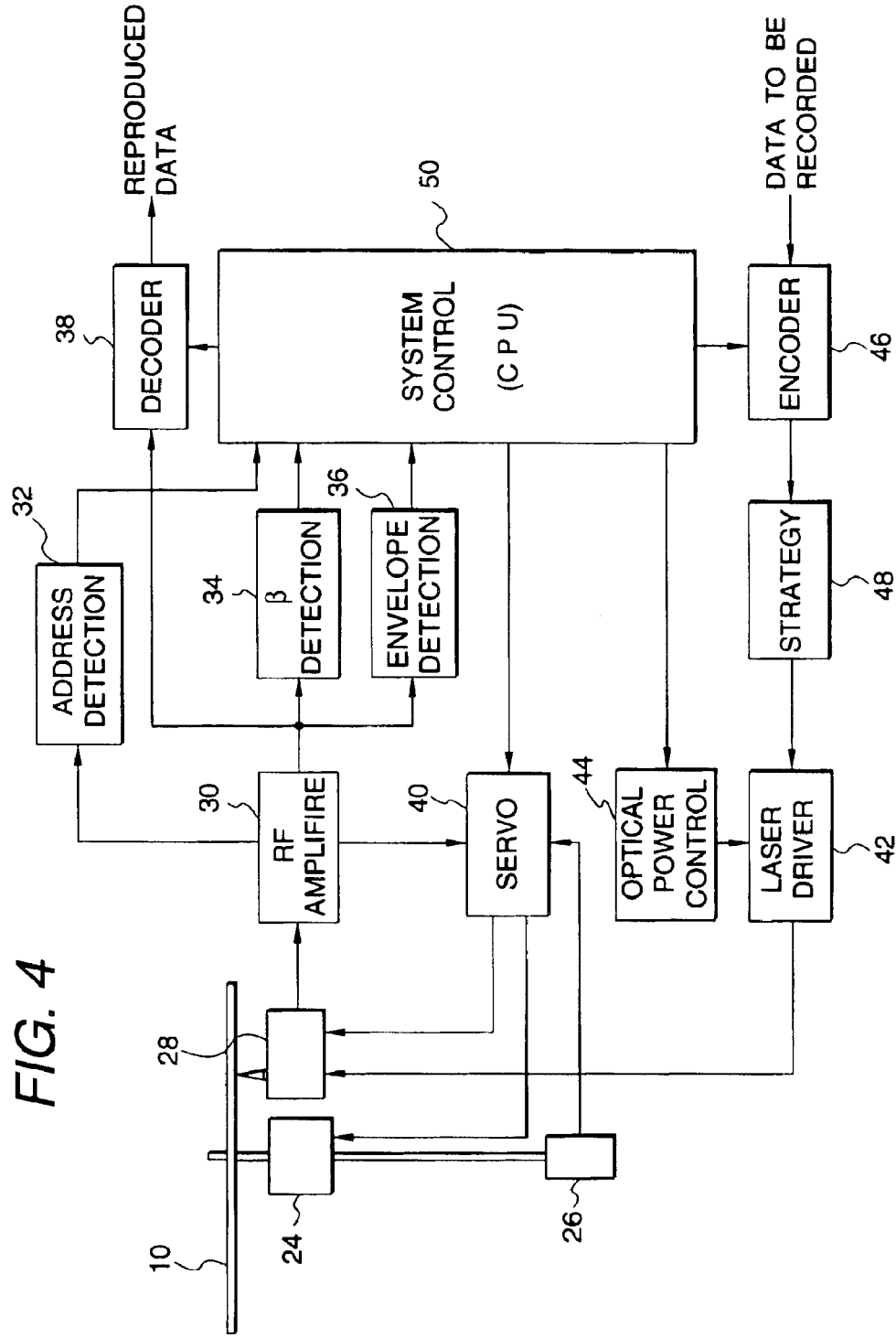
FIG. 4 is a block diagram showing an embodiment of the optical disc recording device according to the present invention.

FIG. 4 shows an embodiment of the optical disc recording device according to the present invention. The optical disc 10 is rotated by a spindle motor 24. A frequency generator 26 detects the rotation number of the optical disc 10. An optical pickup 28 irradiates the optical disc 10 with a laser beam to record and reproduce information. A return-light reception signal (EFM signal) of the optical pickup 28 is supplied to an RF amplifier 30. An address detection circuit 32 extracts a wobble signal component from the EFM signal, and decodes ATIP information contained in the wobble signal component. The ATIP information includes time information (address information) of each position. From the waveform of the EFM signal, a β detection circuit 34 calculates a β (asymmetry) value as a parameter relating to the quality of the reproduced signals. An envelope detection circuit 36 detects the envelope of the EFM signal. The envelope detection is used for, when an OPC is to be performed, previously detecting the end point of the range of each of the count areas 12b and 22b (FIG. 3) where the EFM signals have been recorded. A decoder 38 EFM-demodulates the EFM signals to obtain reproduced data.

A servo circuit 40 controls the rotation of the spindle motor 24, and the focus, tracking, and forwarding operations of the optical pickup 28. The spindle motor 24 is controlled while a CAV control and a CLV control are switched over in accordance with the radial position. The CAV control is performed by controlling the spindle motor 24 so that the rotation number detected by the frequency generator 26 coincides with a preset rotation number. The CLV control is performed by controlling the spindle motor 24 so that the wobble signal detected from the EFM signal reaches a preset linear velocity multiplication. A laser driver 42 drives a laser source in the optical pickup 28. An optical power control circuit 44 controls the laser driver 42 to adjust the laser powers in the recording process (in a test record and an actual record) and the reproducing process. Data to be recorded are EFM-modulated by an encoder 46, the time axis is corrected by a strategy circuit 48, and a laser driving signal of the laser driver 42 is modulated by the data. Information is recorded by driving the laser source of the optical pickup 28 with the modulated laser driving signal. In the recording process, the laser driver 42 drives the laser source of the optical pickup 28 with a predetermined reproducing power. A system control circuit 50 (CPU) controls the whole of the optical disc recording device.

Figure 5:
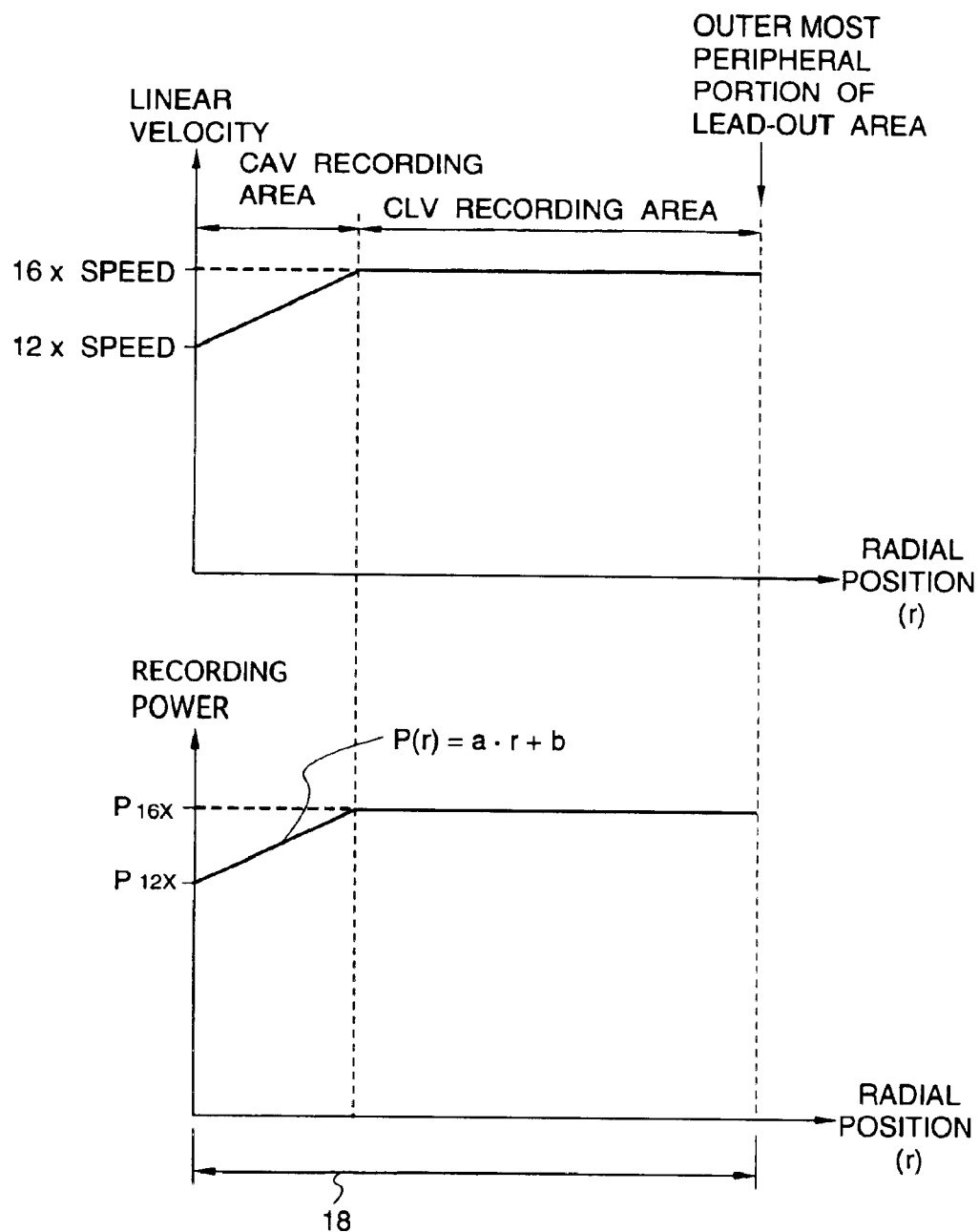
FIG. 5 is a characteristic diagram in which (a) shows the linear velocity (multiplication) in the case where an actual record is performed on a program area, and (b) shows a change of the recording power in this case.

The control in the recording process (in a test record and an actual record) by the optical disc recording device of FIG. 4 will be described. In FIG. 5, (a) shows the linear velocity (multiplication) in the case where an actual record is performed on the program area 18 (FIG. 3) of the optical disc 10, and (b) shows a change of the recording power in this case. In the embodiment, in the inner peripheral side of the disc, the CAV record is performed at a rotation number at which the linear velocity multiplication in the innermost peripheral portion of the program area 18 corresponds to 12× speed. After the linear velocity multiplication at the rotation number reaches 16× speed, the CLV record is performed at 16× speed until the outermost peripheral portion of the lead-out area. At this time, the recording power is controlled to the optimum recording power at each linear velocity. Namely, in the CAV recording area, the recording power is increased in accordance with the linear velocity with starting from the initial value $P_{12x}$ of the recording power, and, in the CLV recording area, the recording power is held to the final value $P_{16x}$ of the recording power in the CAV recording area. In an OPC which is performed prior to an actual record, in the inner peripheral PCA area 12 (FIG. 3), the optimum recording power value $P_{12x}$ at the initial value (12× speed) of the linear velocity is obtained, and, in the outer peripheral side PCA area 22, the optimum recording power value $P_{16x}$ at the final value (16× speed) of the linear velocity is then obtained (the order of obtaining the optimum recording power values $P_{12x}$ and $P_{16x}$ may be inverted).

Figure 1:
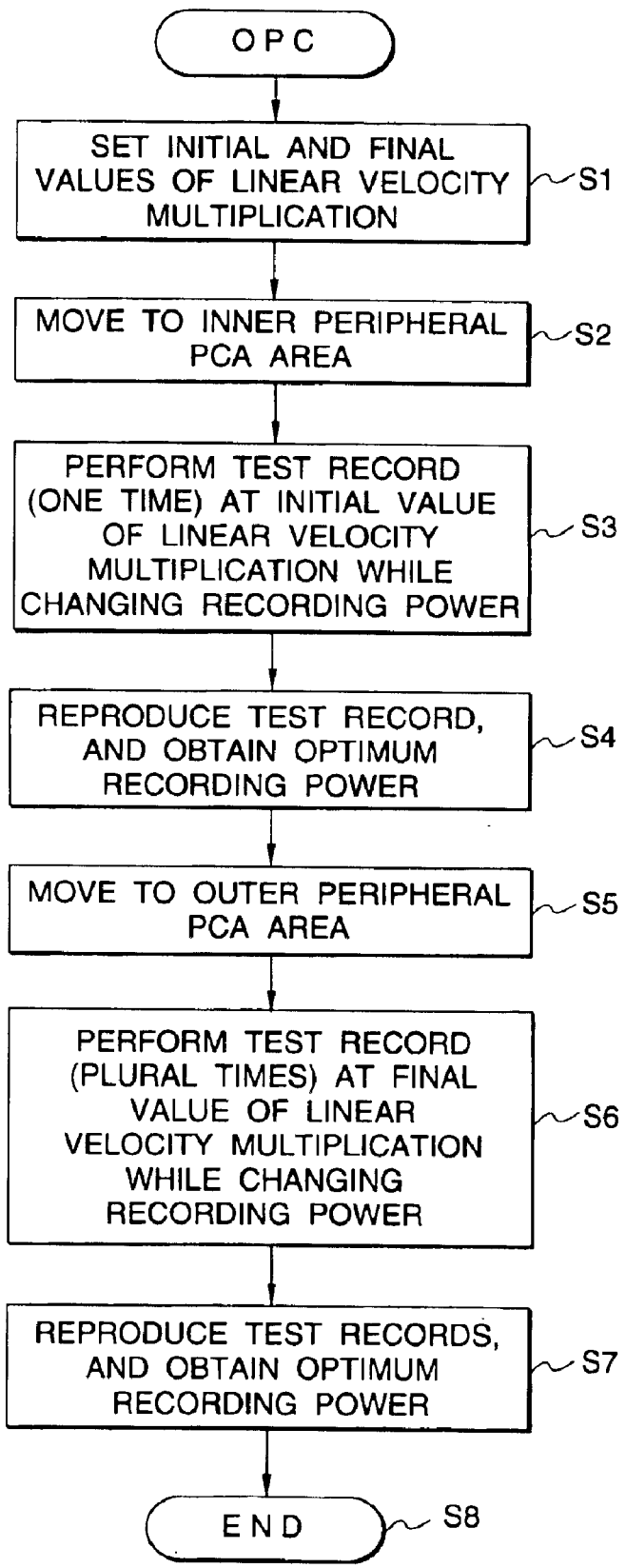
FIG. 1 is a view showing an embodiment of the recording method according to the present invention, and an example of a control flow of an OPC by a system control circuit 50 of FIG. 4 in the case where an actual record is performed as shown in FIG. 5.
Figure 2:
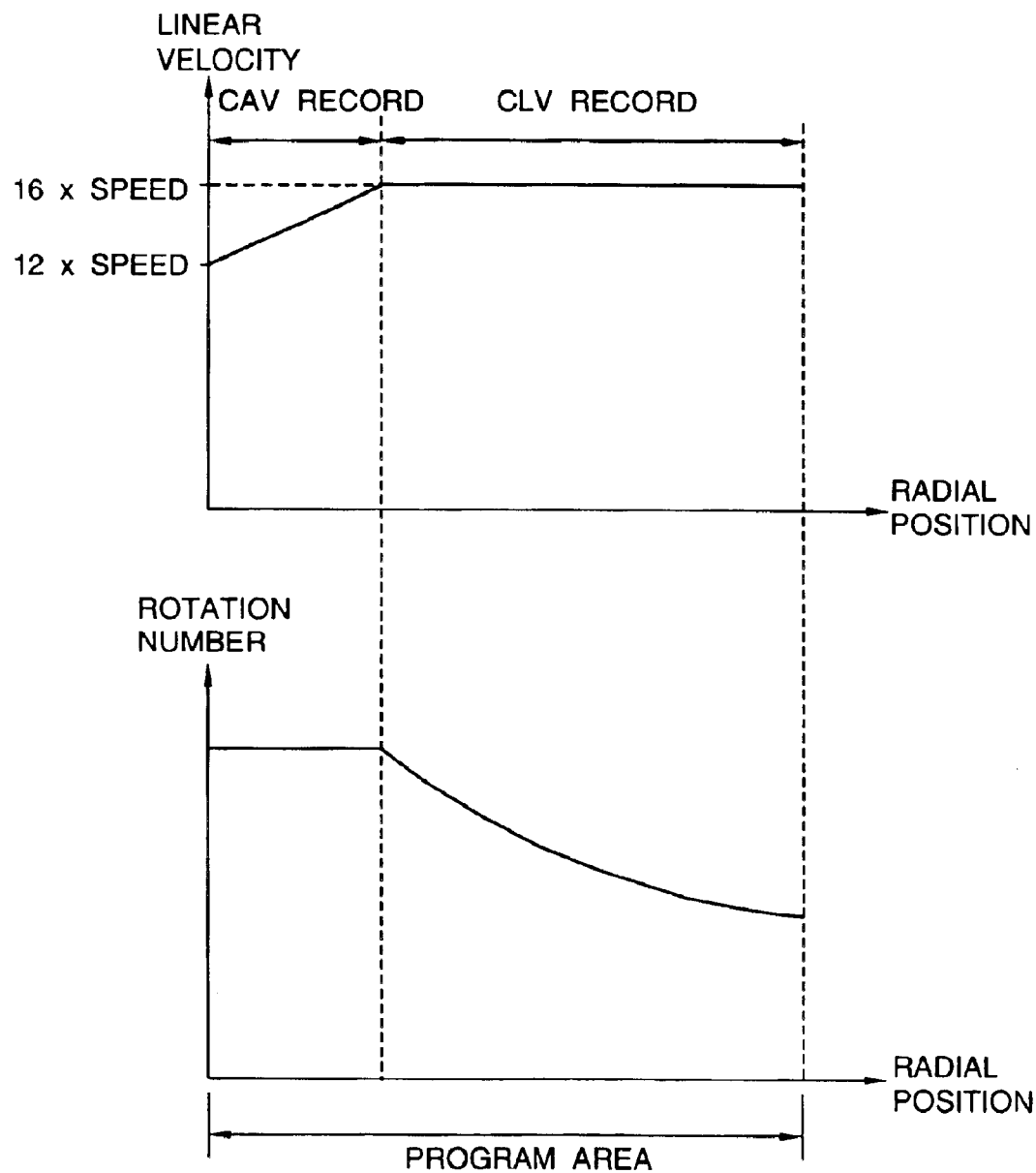
FIG. 2 is a characteristic diagram of the linear velocity and the rotation number in a method in which a record on an optical disc is performed by CAV in the inner peripheral side, and by CLV in the outer peripheral side.
Figure 6:
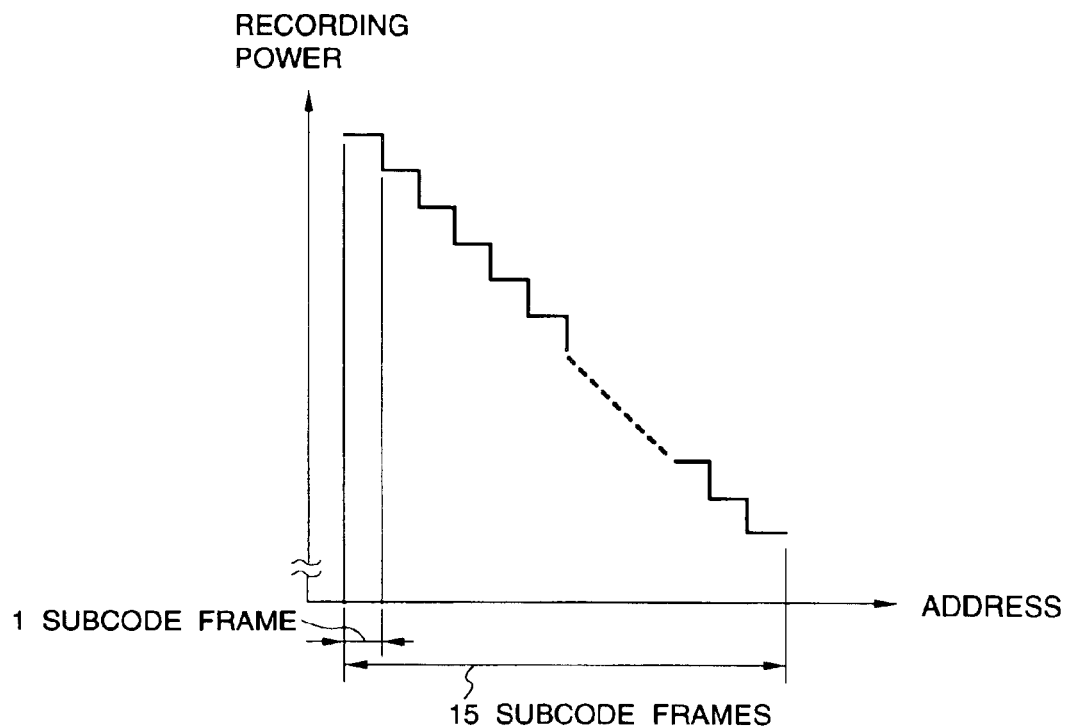
FIG. 6 is a view showing a stepwise change of the recording power in a test record of an OPC.

FIG. 1 shows an example of a control flow of an OPC by the system control circuit 50 of FIG. 4 in the case where an actual record is performed as shown in FIG. 5. As the initial value of the linear velocity multiplication, 12× speed is set, and, as the final value of the linear velocity multiplication, 16× speed is set (S1). When an OPC is started, the optical pickup 28 is moved to the inner peripheral PCA area 12 (S2). In this step, the count area 12b is first traced, a recorded end portion in the count area 12b is detected on the basis of the detection waveform of the envelope detection circuit 36, and the remaining number of OPCs is checked. Based on the detected remaining number, the starting position of the present test record in the test area 12a is designated, and the light beam is located at the position. In this position, on the basis of the wobble signal, the linear velocity multiplication is controlled to the initial value (12× speed), and a test record of the EFM signal is performed one time while the recording power is changed in, for example, 15 steps for each subcode frame as shown in FIG. 6 (in the example of FIG. 6, the recording power is gradually decreased from the maximum value, and alternatively the recording power may be gradually increased from the minimum value) (S3). After the test record, the recorded signal is reproduced, and the β detection circuit 34 calculates the asymmetry value β at each of the recording powers. The asymmetry value β is obtained from (a+b)/(a−b) where a is the peak level (the sign is "+") of the waveform of the reproduced EFM signal, and b is the bottom level (the sign is "−"). The recording power at which the asymmetry value that is closest to the optimum asymmetry value is obtained is selected (or the recording power at the asymmetry value which is determined as optimum is obtained by interpolation from the asymmetry values in the recording powers of the steps), and the selected power is set as the optimum recording power value $P_{12x}$ at the initial value of the linear velocity multiplication (S4). After the optimum recording power value $P_{12x}$ is obtained, marking is done into a designated address of the count area 12b to indicate that the EFM signals for one subcode frame are recorded at the power value $P_{12x}$ and 12× speed, and a portion corresponding to one record is used in the test area 12a.

Then, the optical pickup 28 is moved to the outer peripheral side PCA area 22 (S5). In this step, the count area 22b is first traced, a recorded end portion in the count area 22b is detected on the basis of the detection waveform of the envelope detection circuit 36, and the remaining number of OPCs is checked. Based on the detected remaining number, the starting position of the present test record in the test area 22a is designated, and the light beam is located at the position. In this position, on the basis of the wobble signal, the linear velocity multiplication is controlled to the final value (16× speed), and a test record of the EFM signal is performed while the recording power is changed in, for example, 15 steps for each subcode frame as shown in FIG. 6 (S6). This test record is repeated four times (namely, the operation of FIG. 6 is repeated four times). Assuming that the test record of each time is performed for 15 subcode frames in a position of a diameter r on an optical disc of the specific linear velocity $v_o$, the recording angle θ for the test record of each time is given by the following expression:

$$\theta = (15 v_o / 75 \cdot 2\pi r) \cdot 360.$$

As a result, when the test record is performed in a position of a diameter of 59 mm, the recording angle θ is changed in accordance with the specific linear velocity $v_o$ of the optical disc as listed in the table below.

| Specific linear velocity of optical disc ($v_o$) | Recording angle (θ) |
|---|---|
| 1.2 m/sec. | 233 deg. |
| 1.3 m/sec. | 252 deg. |
| 1.4 m/sec. | 272 deg. |

Figure 7:
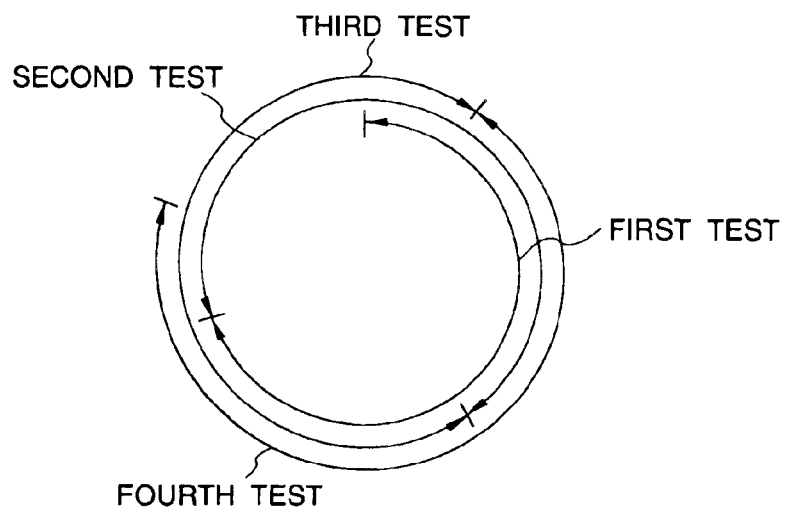
FIG. 7 is a view showing a recording range of one test record and in the circumferential direction of an optical disc on which the test record is performed, and which has the specific linear velocity of 1.3 m/sec.

FIG. 7 shows a recording range (252 deg. for each test record) of one test record and in the circumferential direction of an optical disc on which the test record is performed, and which has the specific linear velocity of 1.3 m/sec. As seen from the figure, the recording ranges are sequentially shifted in the circumferential direction, and it is therefore possible to prevent the same scratch or fingerprints from exerting influence in all the four measurements. This is applicable also to optical discs of 1.2 m/sec. and 1.4 m/sec.

When the four test records are ended, the recorded signals are reproduced, and the β detection circuit 34 calculates the asymmetry value β at each test record. For each of the four test records, the recording power at which the asymmetry value that is closest to the optimum asymmetry value is obtained is selected (or the recording power at the asymmetry value which is determined as optimum is obtained by interpolation from the asymmetry values in the recording powers of the steps), and, on the basis of the recording power values which are respectively obtained for the four test records, the optimum recording power value $P_{16\times}$ at the final value of the linear velocity multiplication is obtained with eliminating influences due to a scratch or fingerprints (S7). For example, this can be performed by the following method. An outlier value(s) (e.g., a value(s) which is largely different from an expected value) of the four recording power values is eliminated, and the average of the remaining values is set as the optimum recording power value $P_{16\times}$. Alternatively, an outlier value (s) is eliminated, and the minimum value of the remaining values is set as the optimum recording power value $P_{16\times}$. After the optimum recording power value $P_{16\times}$ is obtained, marking is done into a designated address of the count area 22b to indicate that the EFM signals for four subcode frames are recorded at the power value $P_{16\times}$ and 16× speed, and a portion corresponding to four records is used in the Lest area 22a. As a result, all steps of the OPC are ended (S8), thereby enabling an actual record to be performed.

In an actual record, on the basis of the optimum recording power $P_{12\times}$ at the initial value of the linear velocity multiplication and the optimum recording power value $P_{12\times}$ at the final value of the linear velocity multiplication which have been obtained as described above, the characteristic which is an interpolation of the optimum recording power values $P_{12\times}$ and $P_{16\times}$ of (b) of FIG. 5:

$$P(r) = a \cdot r + b$$

(in the embodiment, a linear function is used, but not restricted to this) is previously obtained as an appropriate optimum recording power characteristic in the CAV recording area. Based on the characteristic, the recording power and the disc rotation are controlled. Specifically, when the recording position is in the CAV recording area, the disc rotation is CAV-controlled to a fixed rotation number (the rotation number at which the linear velocity multiplication in the innermost peripheral portion of the program area 18 corresponds to 12× speed), the recording power is obtained from the optimum recording power characteristic P(r) in accordance with the radial position r at each timing, and the record is performed at the obtained recording power. When the recording position is in the CLV recording area, the disc rotation is CLV-controlled to 16× speed, and the record is performed while the recording power is fixed to the optimum recording power value $P_{16\times}$ at the final value of the linear velocity multiplication.

For example, the initial and final values of the linear velocity in the constant rotational velocity control may be set by the following method. The user inputs the initial and final values of the linear velocity in the term of a linear velocity multiplication, through a display screen of a computer to which the drive is connected (for example, the initial value of the linear velocity is set to "12× speed" and the final value of the linear velocity to "16× speed"). Alternatively, the maximum rotation number (e.g., 6,000 rpm) may be preset in the driver. When the user inputs a recording velocity multiplication (for example, "16× speed") through a display screen of a computer to which the drive is connected, the computer or the driver may calculate the radial position where, when the record is performed at the preset recording velocity multiplication, the preset maximum rotation number is just attained, and, in the inner peripheral side with respect to the obtained radial position, the CAV record may be performed at the preset maximum rotation number, and, in the outer peripheral side, the CLV record may be performed at the preset linear velocity multiplication. In the alternative, the computer or the driver can automatically set the linear velocity of the CAV record in the innermost peripheral portion, as the initial value of the linear velocity, and set the linear velocity of the CLV record in the outermost peripheral portion, as the final value of the linear velocity.

In the embodiment, the number of repetitions of the test record in the outer peripheral test area is set to four. However, the number is not restricted to this, and may be set to any value which is not smaller than two. In the above, the embodiment in which the recording method according to the present invention is applied to a record in the program area in the information area has been described. Alternatively, the recording method of the present invention may be applied to records in the whole of the lead-in area, the program area, and the lead-out area {a record in a PMA (Program Memory Area) between the lead-in area and the inner peripheral PCA area may be further included}. In the alternative, the initial value of the linear velocity may be set as the linear velocity in the starting position of the lead-in area (or in the starting position of the PMA area). The present invention can be applied not only to a record on a CD-R (RW) disc but also to records on optical discs of other standards including a DVD-R. The parameter relating to the reproduced signal quality is not restricted to the asymmetry value β, and another parameter such as an error rate, or jitter may be used. The method according to the present invention can be applied not only to the case where the CAV record and the CLV record are switched over, but also to that where only the CAV record or the CLV record is performed.

It is contemplated that numerous modifications may be made to the optical disc recording method, the optical disc recording apparatus, and the optical disc, of the present invention without departing from the spirit and scope of the invention as defined in the following claims.

What is claimed is:

1. An optical disc recording method, comprising:
   repeatedly performing a test record a plurality of times, prior to an actual record on an optical disc, in an outer peripheral test area of the optical disc which is on an outer peripheral side with respect to a program area of the optical disc, wherein the test record includes:
   controlling a velocity to a predetermined linear velocity, and
   sequentially changing a recording power;
   obtaining an appropriate recording power value at the linear velocity, on the basis of reproduced signals of the plural test records in the outer peripheral test area; and
   performing an actual record on the optical disc while controlling the recording power to the appropriate recording power value at the predetermined linear velocity, or to an appropriate recording power value which is obtained on the basis of the appropriate recording power value at another linear velocity.

2. The optical disc recording method of claim 1, further comprising:
   on the basis of reproduced signals of the plural test records in the outer peripheral test area, obtaining a recording power value for each of the test records, wherein a predetermined parameter relating to a reproduced signal quality has an appropriate value at the recording power value; and
   on the basis of recording power values which are obtained respectively for the test records, obtaining the appropriate recording power value at the predetermined linear velocity.

3. The optical disc recording method of claim 2, further comprising:
   eliminating an outlier value in the recording power values respectively obtained for the plural test records in the outer peripheral test area;
   obtaining an average value of remaining recording power values; and
   obtaining the average value as the appropriate recording power value at the predetermined linear velocity.

4. The optical disc recording method of claim 2, further comprising:
   obtaining a minimum value of the recording power values respectively obtained for the plural test records in the outer peripheral test area; and
   obtaining the minimum value as the appropriate recording power value at the predetermined linear velocity.

5. The optical disc recording method of claim 1, wherein the plural test records in the outer peripheral test area are respectively performed in areas which are sequentially shifted in a circumferential direction of the optical disc.

6. The optical disc recording method of claim 2, wherein the plural test records in the outer peripheral test area are respectively performed in areas which are sequentially shifted in a circumferential direction of the optical disc.

7. The optical disc recording method of claim 3, wherein the plural test records in the outer peripheral test area are respectively performed in areas which are sequentially shifted in a circumferential direction of the optical disc.

8. The optical disc recording method of claim 4, wherein the plural test records in the outer peripheral test area are respectively performed in areas which are sequentially shifted in a circumferential direction of the optical disc.

9. The optical disc recording method of claim 1, wherein the outer peripheral test area is set in a remaining area which is obtained by removing an area corresponding to a predetermined lead-out area from a portion which is on an outer peripheral side of an information area with starting from a maximum allowable outer peripheral position of the program area.

10. The optical disc recording method of claim 2, wherein the outer peripheral test area is set in a remaining area which is obtained by removing an area corresponding to a predetermined lead-out area from a portion which is on an outer peripheral side of an information area with starting from a maximum allowable outer peripheral position of the program area.

11. The optical disc recording method of claim 3, wherein the outer peripheral test area is set in a remaining area which is obtained by removing an area corresponding to a predetermined lead-out area from a portion which is on an outer peripheral side of an information area with starting from a maximum allowable outer peripheral position of the program area.

12. The optical disc recording method of claim 4, wherein the outer peripheral test area is set in a remaining area which is obtained by removing an area corresponding to a predetermined lead-out area from a portion which is on an outer peripheral side of an information area with starting from a maximum allowable outer peripheral position of the program area.

13. The optical disc recording method of claim 5, wherein the outer peripheral test area is set in a remaining area which is obtained by removing an area corresponding to a predetermined lead-out area from a portion which is on an outer peripheral side of an information area with starting from a maximum allowable outer peripheral position of the program area.

14. An optical disc recording method in which an actual record is performed on an optical disc while, in an inner peripheral side of the optical disc with respect to an adequate radial position, a velocity is controlled by making a rotational velocity constant, and, in an outer peripheral side of the optical disc, the velocity is controlled by making a linear velocity constant at a final value of a linear velocity in the constant rotational velocity control, said method comprising:
   performing a test record one time, prior to the actual record on the optical disc, in an inner peripheral test area of the optical disc which is on an inner peripheral side with respect to a program area of the optical disc, while controlling a velocity by making a linear velocity constant at an initial value of the linear velocity in the constant rotational velocity control record and sequentially changing a recording power;
   repeatedly performing the test record a plurality of times, in an outer peripheral test area which is on an outer peripheral side with respect to the program area of the optical disc, while controlling the velocity by making a linear velocity constant at a final value of a linear velocity in the constant rotational velocity control record and sequentially changing a recording power;

on the basis of a reproduced signal of the one test record in the inner peripheral test area, obtaining a recording power value at which a predetermined parameter relating to a reproduced signal quality has an appropriate value, so that the obtained recording power value is set as a recording power value at the initial value of the linear velocity in the constant rotational velocity control record;

on the basis of reproduced signals of the plural test records in the outer peripheral test area, obtaining a recording power value at which the predetermined parameter has an appropriate value for each of the test records, and obtaining an appropriate recording power value on the basis of recording power values which are obtained respectively for the test records, so that the obtained appropriate recording power value is set as a recording power value at the final value of the linear velocity in the constant rotational velocity control record and in the constant linear velocity control record;

in the area where the constant rotational velocity control record is performed when an actual record is performed on the optical disc, in accordance with the linear velocity at each position, interpolating the value which has been set as the recording power value at the initial value of the linear velocity and the value which has been set as the recording power value at the final value of the linear velocity, and controlling the recording power value to the interpolated value; and in the area where the constant linear control record is performed when the actual record is performed on the optical disc, controlling the recording power value to the value which has been set as the recording power value in the constant linear velocity control record.

15. The optical disc recording method of claim 14, further comprising:

eliminating an outlier value in the recording power values respectively obtained for the plural test records in the outer peripheral test area;

obtaining an average value of remaining recording power values; and setting the average value as the recording power value at the final value of the linear velocity in the constant rotational velocity control record, and in the constant linear velocity control record.

16. The optical disc recording method of claim 14, further comprising:

obtaining a minimum value of the recording power values respectively obtained for the plural test records in the outer peripheral test area; and setting the minimum value as the recording power value at the final value of the linear velocity in the constant rotational velocity control record, and in the constant linear velocity control record.

17. The optical disc recording method of claim 14, wherein the plural test records in the outer peripheral test area are respectively performed in areas which are sequentially shifted in a circumferential direction of the optical disc.

18. The optical disc recording method of claim 15, wherein the plural test records in the outer peripheral test area are respectively performed in areas which are sequentially shifted in a circumferential direction of the optical disc.

19. The optical disc recording method of claim 16, wherein the plural test records in the outer peripheral test area are respectively performed in areas which are sequentially shifted in a circumferential direction of the optical disc.

20. The optical disc recording method of claim 14, wherein the outer peripheral test area is set in a remaining area which is obtained by removing an area corresponding to a predetermined lead-out area from a portion which is on an outer peripheral side of an information area with starting from a maximum allowable outer peripheral position of the program area.

21. The optical disc recording method of claim 15, wherein the outer peripheral test area is set in a remaining area which is obtained by removing an area corresponding to a predetermined lead-out area from a portion which is on an outer peripheral side of an information area with starting from a maximum allowable outer peripheral position of the program area.

22. The optical disc recording method of claim 16, wherein the outer peripheral test area is set in a remaining area which is obtained by removing an area corresponding to a predetermined lead-out area from a portion which is on an outer peripheral side of an information area with starting from a maximum allowable outer peripheral position of the program area.

23. The optical disc recording method of claim 17, wherein the outer peripheral test area is set in a remaining area which is obtained by removing an area corresponding to a predetermined lead-out area from a portion which is on an outer peripheral side of an information area with starting from a maximum allowable outer peripheral position of the program area.

24. An optical disc recording device in which an actual record is performed on an optical disc while, in an inner peripheral side of the optical disc with respect to an adequate radial position, a velocity is controlled by making a rotational velocity constant, and, in an outer peripheral side of the optical disc, the velocity is controlled by making a linear velocity constant at a final value of a linear velocity in the constant rotational velocity control, said device comprising:

a disc servo circuit which rotates the optical disc;

an optical pickup which irradiates the optical disc with alight beam to perform record and reproduction operations on the optical disc;

an optical power controlling section which controls a power of the light beam emitted from the optical pickup;

a signal quality detecting section which obtains a predetermined parameter relating to a reproduced signal quality on the basis of a reproduced signal detected by the optical pickup; and a system controlling section, wherein, in the system controlling section, prior to the actual record on the optical disc, in an inner peripheral test area which is on an inner peripheral side with respect to a program area of the optical disc, a test record is performed one time while a velocity is controlled by making a linear velocity constant at an initial value of the linear velocity in the constant rotational velocity control record and a recording power is sequentially changed, and, in an outer peripheral test area which is on an outer peripheral side with respect to the program area of the optical disc, the test record is repeatedly performed a plurality of times while the velocity is controlled by making a linear velocity constant at a final value of a linear velocity in the constant rotational velocity control record, on the basis of a reproduced signal of the one test record in the inner peripheral test area, a recording power value at which a predetermined parameter relating to a reproduced signal quality has an appropriate value is obtained, and the obtained value is set as a recording power value at the initial value of the linear velocity in the constant rotational velocity control record, on the basis of reproduced signals of the plural test records in the outer peripheral test area, a recording power value at which the parameter has an appropriate value is obtained for each of the test records, and an appropriate recording power value is obtained on the basis of recording power values which are obtained respectively for the test records, and the obtained value is set as a recording power value at the final value of the linear velocity in the constant rotational velocity control record, and in the constant linear velocity control record, and in an actual record on the optical disc, in the area where the constant rotational velocity control record is performed, the record is performed while, in accordance with the linear velocity at each position, interpolating the value which has been set as the recording power value at the initial value of the linear velocity, and the value which has been set as the recording power value at the final value of the linear velocity, and controlling the recording power value to the interpolated value, and, in the area where the constant linear control record is performed, the record is performed while controlling the recording power value to the value which has been set as the recording power value in the constant linear velocity control record.

25. The optical disc recording device of claim 24, wherein the system controlling section eliminates an outlier value of the recording power values respectively obtained for the plural test records in the outer peripheral test area, obtains an average value of remaining recording power values, and sets the average value as the recording power value at the final value of the linear velocity in the constant rotational velocity control record, and in the constant linear velocity control record.

26. The optical disc recording device of claim 24, wherein the system controlling section obtains a minimum value of the recording power values respectively obtained in the plural test records in the outer peripheral test area, and sets the minimum value as the recording power value at the final value of the linear velocity in the constant rotational velocity control record, and in the constant linear velocity control record.

27. The optical disc recording device of claim 24, wherein the system controlling section respectively performs the plural test records in the outer peripheral test area in areas which are sequentially shifted in a circumferential direction of the optical disc.

28. The optical disc recording device of claim 25, wherein the system controlling section respectively performs the plural test records in the outer peripheral test area in areas which are sequentially shifted in a circumferential direction of the optical disc.

29. The optical disc recording device of claim 26, wherein the system controlling section respectively performs the plural test records in the outer peripheral test area in areas which are sequentially shifted in a circumferential direction of the optical disc.

30. The optical disc recording device of claim 24, wherein the system controlling section sets the outer peripheral test area in a remaining area which is obtained by removing an area corresponding to a predetermined lead-out area from a portion which is on an outer peripheral side of an information area with starting from a maximum allowable outer peripheral position of the program area.

31. The optical disc recording device of claim 25, wherein the system controlling section sets the outer peripheral test area in a remaining area which is obtained by removing an area corresponding to a predetermined lead-out area from a portion which is on an outer peripheral side of an information area with starting from a maximum allowable outer peripheral position of the program area.

32. The optical disc recording device of claim 26, wherein the system controlling section sets the outer peripheral test area in a remaining area which is obtained by removing an area corresponding to a predetermined lead-out area from a portion which is on an outer peripheral side of an information area with starting from a maximum allowable outer peripheral position of the program area.

33. The optical disc recording device of claim 27, wherein the system controlling section sees the outer peripheral test area in a remaining area which is obtained by removing an area corresponding to a predetermined lead-out area from a portion which is on an outer peripheral side of an information area with starting from a maximum allowable outer peripheral position of the program area.

34. An optical disc recording method, comprising:
repeating a test recording a plurality of times, prior to an actual recording on a program area of an optical disc, on an outer test area in an outer peripheral portion of the optical disc, at a predetermined linear velocity, by stepwisely changing recording power in each one of the plurality of test recordings;

obtaining an optimum recording power for optimally recording at the predetermined linear velocity based on a plurality of reproduced signals of the plurality of test recordings on the outer test area in the outer peripheral portion of the optical disc; and performing an actual recording on the program area of the optical disc by controlling the recording power according to the optimum recording power for optimally recording at the predetermined linear velocity.

35. An optical disc recording method of claim 34, further comprising:
performing an actual recording on the program area of the optical disc by controlling the recording power to an appropriate recording power at another linear velocity based on the optimum recording power for optimally recording at the predetermined linear velocity.

36. An optical disc recording method of claim 34, the step of repeating a test recording further comprising:
shifting circumferential position of the test recording on the outer test area in the outer peripheral portion of the optical disk from a first position to at least one second position.

37. An optical disc recording method of claim 35, the step of repeating a test recording further comprising;
shifting circumferential position of the test recording on the outer test area in the outer peripheral portion of the optical disk from a first position to at least one second position.

38. An optical disc recording method of claim 36, the step of obtaining an optimum recording power comprising:
obtaining an appropriate recording power of each test recording from recording powers in a test recording as a recording power so that a predetermined parameter relating to a reproduced signal quality has an appropriate value;

eliminating an outlying value of the appropriate recording powers obtained from the test recordings; and obtaining an average value of remaining appropriate recording powers as the optimum recording power at the predetermined linear velocity.

39. An optical disc recording method of claim 36, the step of obtaining an optimum recording power comprising:

obtaining an appropriate recording power of each test recording from recording powers in a test recording as a recording power so that a predetermined parameter relating to a reproduced signal quality has an appropriate value;

eliminating an outlying value of the appropriate recording powers obtained from the test recordings; and obtaining a minimum value of remaining appropriate recording powers as the optimum recording power at the predetermined linear velocity.

40. An optical disc recording method of claim 37, the step of obtaining an optimum recording power comprising:

obtaining an appropriate recording power for each test recording from recording powers in a test recording, wherein the appropriate recording power is a recording power in which a predetermined parameter relating to a reproduced signal quality has an appropriate value;

eliminating an outlying value of the appropriate recording powers obtained from the test recordings; and obtaining an average value of remaining appropriate recording powers as the optimum recording power at the predetermined linear velocity.

41. An optical disc recording method of claim 37, the step of obtaining an optimum recording power comprising:

obtaining an appropriate recording power of each test recording from recording powers in a test recording as a recording power so that a predetermined parameter relating to a reproduced signal quality has an appropriate value;

eliminating an outlying value of the appropriate recording powers obtained from the test recordings; and obtaining a minimum value of remaining appropriate recording powers as the optimum recording power at the predetermined linear velocity.

42. An optical disc recording method of claim 34, wherein the outer test area is set in a remaining area which is obtained by excluding an area corresponding to a predetermined lead-out area from the outer peripheral portion of the optical disc which portion starts from a maximum allowable outer peripheral position of the program area.

43. An optical disc recording method of claim 35, wherein the outer test area is set in a remaining area which is obtained by excluding an area corresponding to a predetermined lead-out area from the outer peripheral portion of the optical disc which portion starts from a maximum allowable outer peripheral position of the program area.

44. An optical disc recording method in which an actual recording is performed on an optical disc while, in an inner peripheral portion of the optical disc with respect to a predetermined radial position, a velocity is controlled by making an angular velocity constant, and, in an outer peripheral portion of the optical disc with respect to the predetermined radial position, the velocity is controlled by making a linear velocity constant which linear velocity is equivalent to a final linear velocity in the control of the constant angular velocity, said method comprising:

performing a test recording one time by stepwisely changing recording power in the test recording, prior to the actual recording on the optical disc, on an inner test area in the inner peripheral portion of the optical disc, while controlling a velocity by making a linear velocity constant which linear velocity is equivalent to an initial linear velocity in the control of the constant angular velocity;

repeating a test recording a plurality of times by stepwisely changing recording power in each one of the test recordings, prior to an actual recording on the optical disc, on an outer test area in the outer peripheral portion of the optical disc, while controlling the velocity by making a linear velocity constant which linear velocity is equivalent to an final linear velocity in the control of the constant angular velocity;

based on a reproduced signal of the test recording on the inner test area, obtaining an optimum recording power for optimally recording at the initial linear velocity from the recording powers in the test recording on the inner test area, wherein the optimum recording power is a recording power at which a predetermined parameter relating to a reproduced signal quality has an appropriate value;

based on reproduced signals of the test recordings on the outer test areas, obtaining appropriate recording powers of each test recording on the outer test areas from recording powers in the test recording on the outer test area, wherein an appropriate recording power is a recording power at which a predetermined parameter relating to a reproduced signal quality has an appropriate value, and based on the appropriate recording powers, obtaining an optimum recording power for optimally recording at the final linear velocity from the appropriate recording powers, performing an actual recording in the inner peripheral portion of the optical disc with respect to the predetermined radial position by interpolating the optimum recording powers for optimally recording at the initial and final linear velocity according to a linear velocity of recording radial position and by controlling recording power to the interpolated recording power according to a linear velocity of recording radial position; and performing an actual recording in the outer peripheral portion of the optical disc with respect to the predetermined radial position by controlling recording power to the optimum recording power for optimally recording at the final linear velocity.

45. An optical disc recording method of claim 44, the step of repeating a test recording further comprising:

shifting circumferential position of the test recording on the outer test area in the outer peripheral portion of the optical disc from a first position to at least one second position.

46. An optical disc recording method of claim 45, the step of obtaining an optimum recording power for optimally recording at the final linear velocity further comprising:

eliminating an outlying value of the appropriate recording powers obtained from the test recordings; and obtaining an average value of remaining appropriate recording powers as the optimum recording power for optimally recording at the final linear velocity.

47. An optical disc recording method of claim 45, the step of obtaining an optimum recording power for optimally recording at the final linear velocity further comprising:

eliminating an outlying value of the appropriate recording powers obtained from the test recordings; and obtaining a minimum value of remaining appropriate recording powers as the optimum recording power for optimally recording at the final linear velocity.

48. An optical disc recording method of claim 44, wherein the outer test area is set in a remaining area which is obtained by excluding an area corresponding to a predetermined lead-out area from the outer peripheral portion of the optical disc which portion starts from a maximum allowable radial position of the program area.

49. An optical disc recording device in which an actual recording is performed on an optical disc while, in an inner peripheral portion of the optical disc with respect to an predetermined radial position, a velocity is controlled by making an angular velocity constant, and, in an outer peripheral portion of the optical disc with respect to the predetermined radial position, the velocity is controlled by making a linear velocity constant which linear velocity is equivalent to a final linear velocity in the control of the constant angular velocity, said device comprising:

a disc servo circuit that rotates the optical disc;

an optical pickup that irradiates the optical disc with a light beam to perform recording and reproduction operations on the optical disc;

a light power controlling section that controls a power of the light beam emitted from the optical pickup;

a signal quality detecting section that obtains a predetermined parameter relating to a reproduced signal quality based on a reproduced signal detected by the optical pickup;

a system controlling section that controls, prior to the actual recording on the optical disc, the optical pickup to perform a test recording one time on an inner test area in the inner peripheral portion of the optical disc and to repeat a test recording a plurality of times on an outer test area in a outer peripheral portion of the optical disc, the light power control section to change recording power stepwisely in the test recording, the disc servo to control a velocity at the inner test area by making a linear velocity constant which linear velocity is equivalent to an initial linear velocity in the control of the constant angular velocity and to control a velocity at an outer test area by making a linear velocity constant which linear velocity is equivalent to the final linear velocity in the control of the constant angular velocity, the signal quality detection section, based on a reproduced signal of the test recording on the inner test area, to detect an optimum recording power for optimally recording at the initial linear velocity from recording powers in the test recording on the inner test area, wherein the optimum recording power is a recording power at which a predetermined parameter relating to a reproduced signal quality has an appropriate value, and based on reproduced signals of the test recordings on the outer test area, to detect appropriate recording powers of each test recording on the outer test area from recording powers in the test recording on the outer test area, wherein an appropriate recording powers is a recording power at which a predetermined parameter relating to a reproduced signal quality has an appropriate value, and based on the appropriate recording powers, to obtain an optimum recording power for optimally recording at the final linear velocity from the appropriate recording powers, on the actual recording on the optical disc, the optical pickup to perform the actual recording on the program area of the optical disc, the light power control section to control the recording power, in the inner peripheral portion of the optical disc with respect to the predetermined radial position by interpolating the optimum recording powers for optimally recording at the initial and final linear velocities according to a linear velocity of recording radial position, to the interpolated recording power according to a linear velocity of recording radial position, and in the outer peripheral portion of the optical disc with respect to the predetermined radial position under the constant linear velocity control, to the optimum recording power for optimally recording at the final linear velocity the disc servo to control a velocity by making an angular velocity constant in the inner peripheral portion of the optical disc with respect to the predetermined radial position and the velocity by making linear velocity constant in the outer peripheral portion of the optical disc with respect to the predetermined radial position.

50. An optical disc recording device of claim 49, wherein the system controlling section controls the optical pickup to repeat a test recording a plurality of times on the outer peripheral portion of the optical disk wherein the test recordings are performed respectively with shifting circumferential position from a first position to at least one second position.

51. An optical disc recording device of claim 50, wherein the system controlling section eliminates an outlying value of the appropriate recording powers obtained from the test recordings and obtains an average value of remaining appropriate recording powers as the optimum recording power for optimally recording at the final linear velocity.

52. An optical disc recording device of claim 50, wherein the system controlling section eliminates an outlying value of the appropriate recording powers obtained from the test recordings and obtains a minimum value of remaining appropriate recording powers as the optimum recording power for optimally recording at the final linear velocity.

53. An optical disc recording device of claim 49, wherein the system controlling section sets the outer test area in a remaining area which is obtained by excluding an area corresponding to the predetermined lead-out area from the outer peripheral portion of the optical disc which portion starts from a maximum allowable radial position of the program area.

54. An optical disc recording method in which an actual recording is performed in an area of an optical disc from an inner peripheral portion of the optical disc to an outer peripheral portion of the optical disc, under an constant angular velocity control, said method comprising:

performing a test recording, by stepwisely changing recording power in the test recording, prior to the actual recording on the optical disc, on an inner test area in the inner peripheral portion of the optical disc, while a velocity is controlled by making a linear velocity constant which linear velocity is equivalent to an initial linear velocity in the control of the constant angular velocity;

repeating a test recording at least same number of test recordings performed on the inner test area, by stepwisely changing recording power in each one of the test recordings, prior to an actual recording on the optical disc, on an outer test area in the outer peripheral portion of the optical disc, while a velocity is controlled by making a linear velocity constant which linear velocity is equivalent to an final linear velocity in the control of the constant angular velocity;

based on a reproduced signal of the test recording on the inner test area, obtaining an optimum recording power for optimally recording at the initial linear velocity from recording powers in the test recording on the inner test area, wherein the optimum recording power is a recording power at which a predetermined parameter relating to a reproduced signal quality has an appropriate value;

based on reproduced signals of the test recordings on the outer test area, obtaining appropriate recording powers of each test recording on the outer test area from recording powers in the test recording on the outer test area, wherein an appropriate recording power is a recording power at which a predetermined parameter relating to a reproduced signal quality has an appropriate value, and based on the appropriate recording powers, obtaining a optimum recording power for optimally recording at the final linear velocity from the appropriate recording powers;

performing an actual recording from the inner peripheral portion of the optical disc to the outer peripheral portion of the optical disc in the area of the optical disc under the constant angular control by controlling a recording power to a recording power interpolated through the optimum recording powers for optimally recording at the initial and final linear velocity according to a linear velocity of recording radial position.

55. An optical disc recording method of claim 54, wherein the test recording on the outer test area is repeated a plurality of times and circumferential positions of the test recordings are shifted from a first position to at least one second position.

56. An optical disc recording method of claim 55, the step of obtaining the optimum recording power for optimally recording at the final linear velocity further comprising:

eliminating an outlying value of the appropriate recording powers obtained from the test recordings; and obtaining an average value of remaining appropriate recording powers as the optimum recording power for optimally recording at the final linear velocity.

57. An optical disc recording method of claim 55, the step of obtaining the optimum recording power for optimally recording at the final linear velocity further comprising:

eliminating an outlying value of the appropriate recording powers obtained from the test recordings; and obtaining a minimum value of remaining appropriate recording powers as the optimum recording power for optimally recording at the final linear velocity.

58. An optical disc recording method of claim 54, wherein the outer test area is set in a remaining area which is obtained by excluding an area corresponding to a predetermined lead-out area from the outer peripheral portion of the optical disc which portion starts from a maximum allowable radial position of the program area.

* * * * *